July 27, 1965 P. SCHWARTZ ETAL 3,197,700
APPARATUS AND METHOD FOR MEASURING TIME INTERVALS BETWEEN
POINTS ON RECURRING SIGNALS
Filed July 27, 1961 5 Sheets-Sheet 1

United States Patent Office

3,197,700
Patented July 27, 1965

3,197,700
APPARATUS AND METHOD FOR MEASURING TIME INTERVALS BETWEEN POINTS ON RECURRING SIGNALS
Paul Schwartz, Old Bethpage, Richard S. Rothschild, New York, Gerard G. Leeds, Great Neck, and Robert M. Sugarman, Patchogue, N.Y., assignors, by mesne assignments, to General Applied Science Laboratories, Inc., Westbury, N.Y., a corporation of New York
Filed July 27, 1961, Ser. No. 127,299
17 Claims. (Cl. 324—68)

The present invention relates to an electronic system for and the method of measuring time intervals on signals and more particularly to a system for and method of measuring automatically and accurately the high speed switching characteristics of electronic circuits including semiconductor devices and tubes. These characteristics include time intervals in the nanosecond (millimicrosecond) range such as the risetime, fall time, turn-on delay, storage time, turn-on time and turn-off time of switching signals.

Time intervals on high frequency signals or extremely fast pulses are of such short duration that it has been extremely difficult to measure accurately those time intervals occurring in the nanosecond range even with complex high frequency circuitry. Heretofore, one method of making high speed switching time measurements has been to display on an oscilloscope screen the switching waveforms on which the time interval is desired to be measured. Since the oscilloscope display is generally accomplished by the use of pulse sampling techniques, the artificial time of the display on the oscilloscope is proportional to the actual time of the signal within the limits of time calibration linearity. An operator may then manually position markers horizontally on the sampled oscilloscope display at the points between which the time interval is desired to be measured. The time between these markers may be observed visually or they may be employed to produce an output signal which can be used to start and stop integrators or start and stop a timing clock, thereby providing a time interval reading.

Another method of measuring high speed switching characteristics has been to ascertain first the initial steady state level and the final steady state level of the signal. Then, by calculation, the actual voltage levels equal to the levels on the signal between which the time interval is desired to be measured can be determined. For example, the 10% and 90% points of the voltage difference between the initial and final steady state levels generally represent risetime. These 10% and 90% voltage levels are fixed test limit amplitude signals which can then be fed into two discriminators, the first of which triggers the generation of a ramp voltage that rises linearly with time and the second of which stops the voltage rise. The amount of the voltage rise is therefore proportional to the desired time interval measurement.

Accurate measurements have been difficult to make since the prior art systems depend on the accurate ascertaining of the initial and final steady state values of the switching waveform, on a constant signal amplitude and on a constant system gain. False readings may be produced if the discriminators fire on signals, such as noise signals, which are not the primary ones being read. Moreover, time interval measurements of extremely short duration, are limited by the reaction time of the discriminators. Where an oscilloscope display is employed, the exercise of an operator's judgment is usually required to position the markers manually. In addition to the inevitable presence of possible human error, the time consumed in making the measurement is relatively lengthy. Furthermore, since measurements on the oscilloscope screen are always made from a point on the waveform with respect to its base line position, any signal drift causes inaccuracies to be introduced into the measurement. When attempting to measure turn-on delay, another disadvantage is that both the input and output waveforms must be displayed on the oscilloscope screen. Since the rise time of the waveform may be of much briefer duration than the turn-on delay, the accuracy of the risetime measurement is reduced due to the fact that, for convenience, one time scale is used for both displays. Accordingly, it is seen that the various systems and methods heretofore employed have exhibited certain inherent limitations and disadvantages and it has been difficult to ascertain accurately high speed switching time intervals.

The present invention is particularly useful and advantageous in that it provides an improved electronic system for measuring time intervals of extremely short duration automatically and with a greater precision than heretofore possible.

Of particular importance is a novel feature wherein the system is designed automatically to extract and relate reference voltages, corresponding to the desired percentage levels on the signal under consideration, to a ramp voltage whose instantaneous amplitude is representative of an instant of time during the signal cycle. Thus, since the system automatically computes the required reference levels as percentages of the difference between the initial and final steady state values of the signal, rather than as fixed voltage test limits which may be inaccurate or ambiguous, there is no possibility of error, from test to test, in the measurement arising from slight changes in signal amplitude, signal base line or system gain. The automatic features minimize the possibility of human error and assure a time interval measurement that is both precise and rapid.

The invention also includes a novel arrangement which enables the same system to measure automatically and with equal precision, both the switching characteristics of circuits which require the consideration of the time interval on one signal as well as those characteristics which require the consideration of the time interval between two signals.

Of further importance is a novel feature of the invention which enables the time interval measurement to be made irrespective of whether the signals under consideration have positive-going waveforms or negative-going waveforms.

In general, the system described herein for practicing the present invention involves "slowing down" the recurring fast signals under analysis by means of a pulse sampling technique and thereby generating an artificial signal or train of pulses in a slower time range, whose shape, or envelope, is identical to that of the fast signal. The sampling technique, therefore, causes a high frequency signal to appear as one considerably reduced in frequency. In the pulse sampling technique, shifting of the strobe sampling pulse "across" the recurring test signal is effected by an input voltage, the magnitude of which controls the delay in the occurrence of the strobe pulse. Thus, the instant of sampling depends on the magnitude of the input voltage which is obtained from a controllable voltage generator. Consequently, the magnitude of the voltage generator output can be equated with "time" so that a particular voltage level represents a particular instant of time in the cycle of recurring signals.

Having established a relationship between time in the cycle of recurring signals and the magnitude of the voltage generator output, it is now necessary to correlate the particular points of interest on the signal with a particular magnitude from the voltage generator output. The level of the point or points of interest may already be established, or, if it is not established, that may be done readily. In this situation, the level is applied as a reference potential to a comparator circuit into which is also fed the train of sampling pulses whose envelope corresponds to the slowed down waveform of the signal. The comparator circuit triggers at the instant the level of the train of sampling pulses crosses the level of the reference potential and the triggering fixes an instant in time on the slowed down sampling envelope which is representative of the point on the signal. Similarly, a second instant in time on the slowed down sampling envelope representative of a second point on the signal is established. The interval between the established instants of time is representative of the time interval desired to be measured.

Where the level of the point or points of interest is not established outside the system, the system is itself capable of establishing the desired levels as percentage voltages of the signal voltage. Accordingly, in the preferred embodiment, the system samples the recurring signal at an instant late in time when the recurring signal has attained its final steady state value. The sampling circuit output is a pulse output voltage, the peak magnitude of which is detected and stored. Similarly, the recurring signal is sampled at an instant early in time, when the recurring signal is still in its initial steady state value. Again, the magnitude of the output pulse is detected and stored. The difference between the magnitudes of the two aforementioned pulses represents the difference in magnitude between the initial and final steady state values of the recurring signal. A predetermined percentage of the difference voltage, corresponding to a desired percentage point of interest on the signal, is derived and applied to one input of a comparator circuit as a reference potential. Similarly, a second reference potential equal to another percentage of the difference voltage may be derived, if required. The recurring signal is then scanned by the pulse sampling technique, employing a ramp voltage as the output of the voltage generator circuit. This sampling circuit output, which comprises a train or a succession of output voltages, is then applied to another input of the comparator circuit which is set to trigger and produce a "command" pulse at the instant the level of the peaks of the train of pulses from the sampling circuit output crosses the level of the reference potential input. By this means, there is established a "command pulse" at the precise instant in the sampling time cycle that the sampling pulse output crosses a predetermined percentage level. The "command pulse" thus obtained is employed to actuate a storage device which is also coupled to the output of the voltage generator and which stores the instantaneous level of the voltage generator output at the moment of occurrence of the "command pulse." The same process is employed to store the level of the voltage generator output at an instant of time that the sampling pulse output crosses the second predetermined percentage level. Inasmuch as the voltage generator output is related to time in the signal cycle, the difference in the stored voltage levels of the voltage generator circuit represents the time interval desired to be measured. If desired, a meter may be connected to indicate the voltage difference and the meter may be calibrated in nanoseconds since the voltage is proportional to time.

The system may be programmed to derive time measurements between any two points on a signal or between points on different signals.

The invention accordingly comprises the several steps and the relation of one or more of such steps with respect to each of the others, and the system possessing the feature, properties, and the relation of elements, which are exemplified in the following detailed disclosure, and the scope of the invention will be indicated in the claims.

For a fuller understanding of the nature and objects of the invention, reference should be had to the following detailed description taken in connection with the accompanying drawings in which like numerals of reference indicate corresponding parts and in which.

Figure 1:
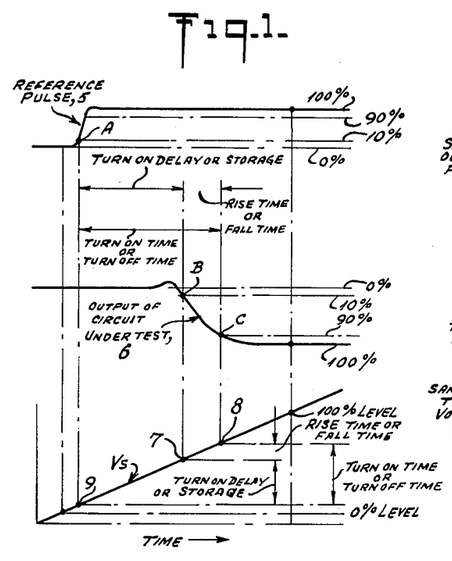
FIG. 1 illustrates typical waveforms, the time parameters customarily measured, and their timing relationship with respect to a voltage $V_s$.

In FIGURE 1, there is shown a first signal which may be a reference pulse 5, such as, for example, an input test pulse to a semiconductor device, a tube or to any circuit under test whose switching characteristics it is desired to measure. The output of the circuit under test is a second signal which may be signal pulse 6. It is understood that in FIGURE 1, the reference pulse 5 is shown as a positive-going waveform and signal pulse 6 as a negative-going waveform for illustrative purposes only, and that the reference pulse 5 and the signal pulse 6 each may be either positive-going or negative-going waveforms. The time for either reference pulse 5 or signal pulse 6 to go from its initial steady state level to its final steady state level is finite, as is the time interval between the signal pulse response of the circuit under test and the reference pulse 5 and these time intervals are goverened by the characteristics of the circuit under test. It is frequently of importance to ascertain these time intervals, and, accordingly, it has been the practice to fix arbitrary limits at the 10% (A and B) level on the reference pulse 5 and signal pulse 6 waveforms respectively, and at the 90% level C on the signal pulse 6 waveform, as the time between which measurements are standardized. Thus, the "risetime" or "fall time" of a pulse is the time it takes to change from 10% (B) to 90% (C) of its final steady state level as compared with its initial steady state level. The "turn-on delay" or "storage time" (A to B) is the time interval between 10% of the reference pulse 5 and 10% of the signal pulse 6. The "turn-on time" or "turn-off time" (A to C) is the time interval between 10% of the reference pulse 5 to 90% of the signal pulse 6. To obtain the high degree of accuracy in the measurement of the desired time intervals, the system of the invention, in the preferred embodiment, relates the magnitude of a voltage $V_s$ to time in the cycle of recurring signals and a particular time interval is determined by observing the difference in voltage levels on $V_s$. Thus, where is is desired to measure the "risetime" or "fall time" (B to C), for example, of signal pulse 6, the system can establish the magnitude of the voltage $V_s$ at the first test limit 7 corresponding to the instant of occurrence of the 10% level and establishes a second test limit 8 corresponding to the 90% level on the signal pulse 6. The difference in voltage between the first test limit 7 and the second test limit 8 represents the desired risetime or fall time. Similarly, the turn-on delay or storage time A to B, can be established by the difference in voltage levels on $V_s$ between test limit 9 and test limit 7 and turn-on time or turn-off time (A to C) is established by the difference in the voltage levels on $V_s$ between test limit 9 and test limit 8.

Figure 2:
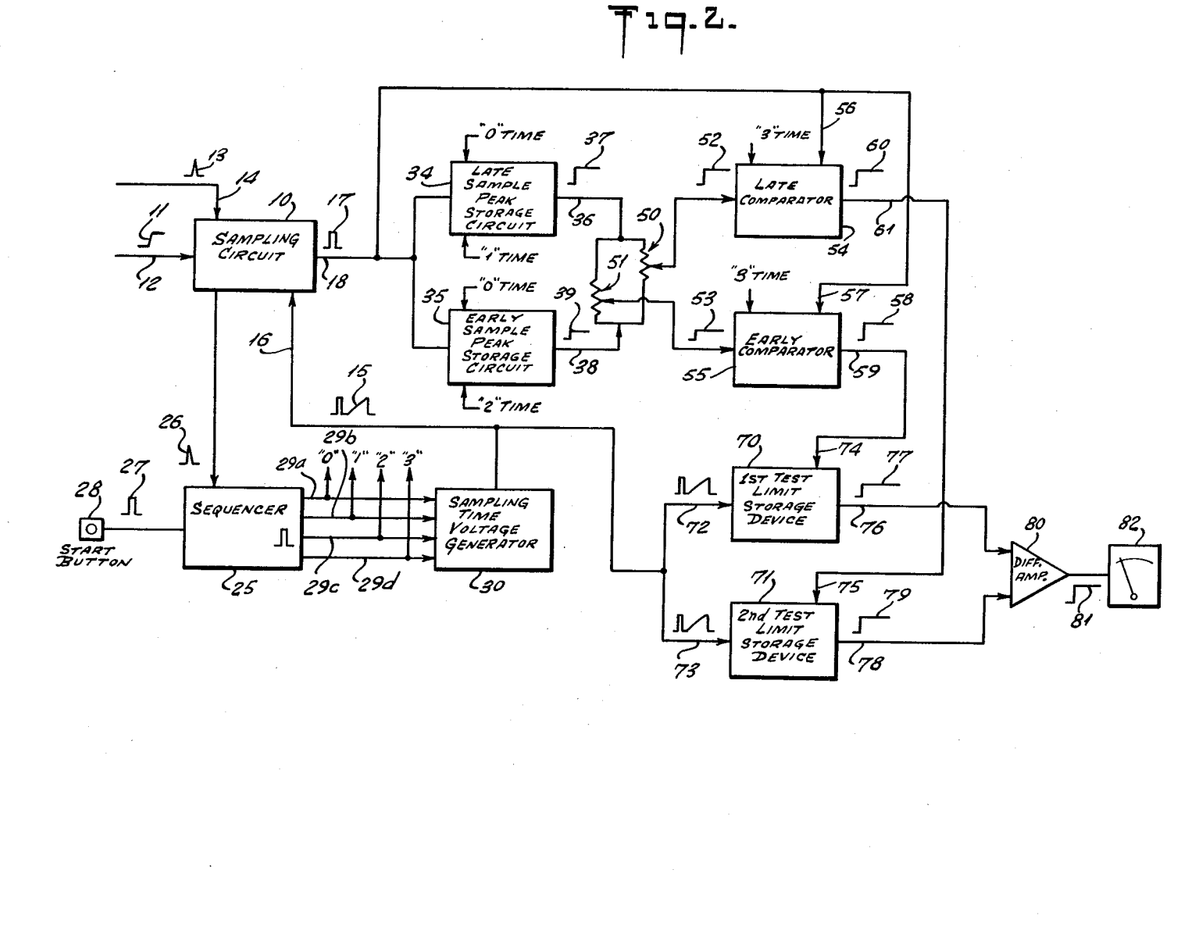
FIG. 2 is a block diagram of a system embodying the present invention.

Referring now to FIG. 2, the system embodying the present invention incorporates a pulse sampling circuit 10 to which is applied the recurring signal under analysis here indicated as a test pulse 11 at signal applying means, such as input 12. Test pulse 11 may be any recurring signal such as the reference pulse 5 or signal pulse 6 including non-unidirectional signals. For each test pulse 11 applied to the sampling circuit 10, there is also applied a trigger pulse 13 at input 14. The time relationship between the recurring test pulse 11 and the trigger pulse 13 must, of course, be fixed as it is in any samplying circuit, since the trigger pulse 13 is employed as the basis from which the sampling strobe is derived. In addition, sampling time voltage $V_s$ 15 is applied to sampling circuit 10 at input 16.

The sampling circuit 10 is of a type which is well known in the art and is such that any desired input signal can be reproduced statistically using point by point methods. Thus, the trigger pulse 13 is employed to produce a "strobe" pulse (not shown in FIG. 2) which mixes with the test pulse signal at a particular instant and produces a sampled output pulse, generally designated by 17 at the output 18 of the sampling circuit 10. The sampled output pulse 17 has an amplitude representative of the amplitude of the test pulse input signal 11 at the instant of sampling.

Figure 3:
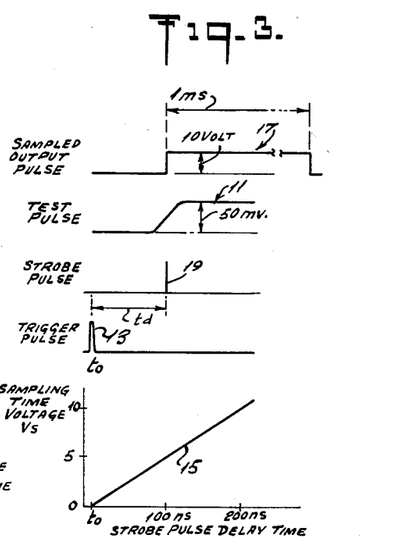
FIG. 3 is a timing diagram indicating the timing relationships of the various voltages within the sampling circuit.
Figure 4:
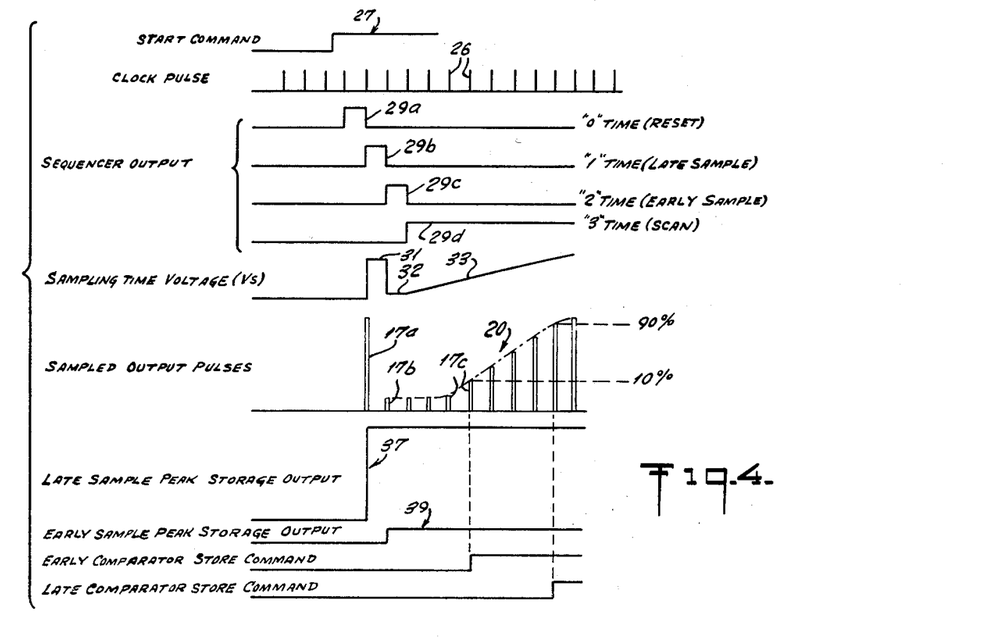
FIG. 4 is a timing diagram illustrating the relationships of the sequencing output gating pulses, the sampling time voltage, the sampled output pulses, the peak storage outputs and the comparator store commands.

The particular instant of sampling is determined by the amount of the delay in the occurrence of the strobe pulse with respect to the test pulse signal. Such delay, as is well known, may be controlled from the magnitude of a voltage, which, in the present embodiment is the voltage $V_s$, the sampling time voltage 15. Frequency or oscillator phase shift means for delaying the strobe pulse may also be employed, if desired, provided this shifting means is controlled from a voltage such as the sampling time voltage $V_s$. The timing relationship which must be maintained between the instant of sampling and the sampling time voltage 15 is shown in FIG. 3. There, it is seen that the trigger pulse 13 initiates the timing cycle at the designated time $t_0$. Derived from trigger pulse 13 within sampling circuit 10 is strobe pulse 19. However, the amount of the time delay between the occurrence of trigger pulse 13 and the occurrence of strobe pulse 19 depends on the instantaneously applied magnitude of $V_s$, the sampling time voltage 15, to the sampling circuit 10. For illustrative purposes, in FIG. 3, it is seen that a particular magnitude of $V_s$, for example, 5 volts corresponds to an instant $t_d$ 100 nanoseconds after time $t_0$. Consequently, if 5 volts is applied to the input 16 of the sampling circuit 10, the strobe pulse occurs at time $t_d$, which is 100 nanoseconds after the occurrence of the trigger pulse 13. Therefore, when the strobe pulse 19 mixes with the test pulse 11 in sampling circuit 10, the sampled output 17 is a voltage having an amplitude which is representative of the test pulse amplitude at a time 100 nanoseconds after the occurrence of trigger pulse 13. The sampled output pulse 17 preferably is amplified and stretched in time, by appropriate amplifier and stretcher circuits within sampling circuit 10, so that the peak level of the output pulse is maintained constant for a period of time which is relatively long with respect to the order of magnitude of the time of the test pulse. It is therefore possible, for example, that the total time interval of the test pulse 11, between its initial and its final level is in the order of nanoseconds while the sampled output pulse, representative of a single instant in the test pulse waveform, is maintained for a period of time in the order of milliseconds. By mixing a strobe pulse 19 with successive signals of the recurring test pulses 11 at varying instants of time in the test pulse cycle, it is possible to scan the test pulse 11 and produce at the output of sampling circuit 10 a succession of peak output voltages or a train of pulses, each of which has an amplitude representative of the test pulse amplitude at the instant of sampling. Consequently, it is seen that by employing the pulse sampling technique it is possible to reproduce the recurring waveform of a "fast" test pulse by a train of pulses having an envelope 20 as shown in FIG. 4, whose shape is identical to that of the test pulse waveform. Each pulse of the train of pulses is a sample of test pulse waveform 11, taken at an instant which is determined by the magnitude of $V_s$. In this manner, the test pulse waveform may be said to be "slowed down" since the test pulse waveform is in the order of nanoseconds while the envelope 20 is in the order of milliseconds. It is, of course, understood that the aforementioned magnitudes, and those shown in FIG. 3, are intended as being merely illustrative and not limiting.

Although the system may be arranged for manual operation if desired, it is convenient to perform the time interval measurement automatically and for this purpose it is preferred to establish a particular time sequence during which predetermined operations will be performed. Accordingly, a sequencer circuit 25 can be included in the system which is adapted to program sequentially the system operations.

In its preferred embodiment, the sequencer 25 is an electronic stepping switch such as a binary to decimal convertor whose input is a clock pulse 26 derived from each trigger pulse 13 and therefore synchronized with respect to the trigger pulses 13. The clock pulse 26 preferably is obtained from the sampling circuit 10, since within the sampling circuit, the trigger pulse 13 is passed through various circuits which shape it, and from which a suitable clock pulse 26 may be conveniently obtained.

The sequencer 25 is designed to commence its predetermined cycle of operation upon the occurrence of the first clock pulse 26 after the receipt of a start command 27, which may be applied to sequencer 25 by pressing start button 28. For each clock pulse input 26, the stepping switch in the sequencer circuit 25 advances one position until it reaches the final position in the cycle where it remains until it is reset. The output of the sequencer 25 is a positive gating pulse 29 which appears at one of four channels 29a, 29b, 29c or 29d, switching in sequential order from one channel to the next for each succeeding clock pulse input 26. The relationship of the start command 27, the clock pulses 26 and the sequencer output gating pulse on the four channels 29a, 29b, 29c and 29d is shown in FIG. 4. Thus, four distinct time periods are set up, which for convenience, may be denominated as "0" time, "1" time, "2" time and "3" time, and appear at the four sequencer channel outputs 29a, 29b, 29c and 29d respectively. With the exception of the last gating pulse appearing on channel 29d, which is maintained until reset, the output gating pulse 29 on each of the other channels is maintained for a period of time equal to the time between clock pulses 26, and may be in the order of ten milliseconds.

During '0' time, the output pulse 29 on channel 29a is employed to reset and clear the operational sections of the system so that the storage devices are in condition to receive the information required to be stored.

During "1" time, "2" time and "3" time, the gating pulses 29 on channels 29b, 29c and 29d respectively are employed to control the output of sampling time voltage generator 30 in a predetermined manner. For example, during "1" time, the output $V_s$, of the sampling time voltage generator 30 is controlled to be set at a relatively high voltage 31. During "2" time, $V_s$ is controlled to be set at a relatively low voltage 32. During "3" time, $V_s$ is controlled to be a continually rising ramp voltage 33, which rises from the low voltage 32 to the high voltage 31. Any desired slope may be selected for ramp voltage 33 by incorporating suitable adjustable controls in the sampling time voltage generator circuit 30.

The output voltage $V_s$ of the sampling time generator 30 is applied to the input 16 of the sampling circuit 10 and, as previously described, is employed to control the delay in the occurrence of strobe pulse 19, so that the instant of sampling is determined by the magnitude of voltage $V_s$. Therefore, during "1" time, the magnitude of $V_s$ being a high voltage 31, the instant of sampling occurs late in the cycle of the test pulse 11. Thus, at the output 18 of the sampling circuit 10, during "1" time, there will be a sampled output pulse 17a (shown in FIG. 4) having an amplitude representative of the test pulse amplitude 11 at an instant late in time and therefore, may be referred to as a "late sample." Since the output of the sampling time voltage generator 30 during "2" time is a relatively low voltage 32, the strobe pulse 19 will occur relatively early in time with respect to test pulse 11. At the output 18 of the sampling circuit 10, there will, therefore, be a sampled output pulse 17b having an amplitude representative of the amplitude of the test pulse 11 at an instant relatively early in time and may be referred to as an "early sample." During "3" time, $V_s$ is a constantly rising ramp voltage 33, and therefore, for each succeeding trigger pulse 13, the strobe pulse 19 is shifted successively in time across the test pulse 11 resulting in a train of sampled output pulses 17c, the peaks of which form a modulated envelope 20, reproducing, in "slowed down" form, the test pulse waveform 11.

The sampled output pulses 17 of the sampling circuit 10 are applied to first and second storage circuit means which may be conveniently referred to as the "late sample" peak storage circuit 34 and the "early sample" peak storage circuit 35. Before commencing the cycle of storing information in these storage circuits, it is necessary to reset the circuits and clear therefrom any previously stored information. This may be accomplished by connecting channel 29a of the sequencer circuit 25 to the storage circuits 34 and 35, so that during "0" time, the gating pulse 29 clears and resets the circuits so that they are in condition to detect and store the desired information on receipt of the appropriate commands. Channel 29b is also connected to the "late sample" peak storage circuit 34, and the positive gating pulse 29 appearing thereon commands the "late sample" peak storage circuit 34 to detect and store the peak level of sampled output pulse 17a of the sampling circuit 10 during "1" time. The "late sample" peak storage circuit 34 is adapted to produce at its output 36 a late sample peak storage output voltage pulse 37 having a constant amplitude representative of the amplitude of the late sample output pulse 17a. Similarly, channel 29c is connected to the "early sample" peak storage circuit 35 and the positive gating pulse 29 appearing thereon during "2" time causes at the output 38 of the "early sample" peak storage circuit 35 an early sample peak storage output voltage pulse 39 which will have a constant amplitude representative of the amplitude of the early sample output pulse 17b.

It should be noted that the difference between the late sample peak storage output voltage 37 and the early sample peak storage output voltage 39 is representative of the difference between the final and initial levels of the test pulse 11. Potentiometers 50 and 51 are connected between output 36 of "late sample" peak storage circuit 34 and output 38 of "early sample" peak storage circuit 35 and the potentiometers 50 and 51 each may be adjusted to tap off any desired percentage of the difference voltage between the storage levels 37 and 39. Consequently, reference potential 52 and reference potential 53 are each derived by the potentiometers and are set to predetermined percentage levels corresponding to the percentage levels on the test pulse 11 between which it is desired to measure the time interval.

The reference potentials 52 and 53 are applied respectively to separate comparator circuits which, for convenience, may be referred to as the "late" comparator 54 and the "early" comparator 55. The output 18 of the sampling circuit 10 is also coupled to each of the comparator circuits at inputs 56 and 57 respectively. Each comparator circuit is of a design which is well known to those skilled in the art and is such that during "3" time, the instant the magnitude of the peak voltage of the train of pulses 17c crosses the level of the reference potential, the comparator circuit produces an output command pulse. Thus, as the peak amplitude of the train of pulses 17c, during the "3" time scan period, crosses the level of reference potential 53, the "early" comparator 55 triggers and produces a "store command" pulse 58 at its output 59. Similarly, as the peak amplitude of the train of pulses 17c, during the "3" time scan period, crosses the level of the reference potential 52, the "late" comparator 54 triggers and produces a "store command" pulse 60 at its output 61. Once triggered, the comparator circuits remain triggered until reset, the resetting preferably being accomplished by gating pulse 29, obtained from channel 29d at the commencement of "3" time.

The output, $V_s$, of the sampling time voltage generator 30 is also connected to a first test limit storage device 70 and a second test limit storage device 71 at inputs 72 and 73 respectively. Command pulse 58 from the "early" comparator 55 is applied to the first test limit storage device 70 at input 74 and command pulse 60 from the "late" comparator 54 is applied to the second test limit storage device 71 at input 75. The test limit storage devices 70 and 71 are such that upon receipt of a command pulse at inputs 74 and 75 respectively, the instantaneous voltage at input 72 and 73 respectively is immediately detected and stored. At the output 76 of the first test limit storage device 70, there is, therefore, a voltage 77 having an amplitude which is representative of the instantaneous magnitude of the sampling time voltage $V_s$ at the instant the store command 58 is received. Similarly, at the output 78 of the second test limit storage device 71, there is a voltage 79 having an amplitude which is representative of the instantaneous magnitude of the sampling time voltage $V_s$ at the instant that the store command 60 is received.

Since the magnitude of the sampling time voltage $V_s$ is representative of time with respect to the test pulse 11, the difference between stored voltage level 77 and stored voltage level 79 is representative of the time interval desired to be measured. Voltage levels 77 and 79 are, therefore, applied to a difference amplifier 80 which produces an output voltage level 81 representative of the difference between the voltage levels applied at its inputs. The voltage level 81 may also be applied to a meter 82 which maybe conveniently calibrated in nanoseconds to provide a direct reading of the time interval desired to be measured.

Thus, in the preferred embodiment of the invention, where it is desired to measure on a recurring signal a time interval such as risetime, the recurring signal is applied to sampling circuit 10, where it is sampled according to a predetermined schedule set up during successive time periods, "1" time, "2" time and "3" time. During "1" time, the output of the sampling time voltage generator 30 preferably is relatively high and the instant of sampling is late in the time of the signal cycle. Consequently, "late sample" peak storage circuit 34 detects and stores the late sample 17a representative of the final level of the signal under test. During "2" time, $V_s$ preferably is relatively low and the "early sample" peak storage circuit 35, therefore, detects and stores the early sample 17b representative of the initial level of the signal under test. Potentiometer 51 is preset to select a reference potential 53 which is 10% of the difference between the stored output samples 37 and 39 and potentiometer 50 is preset to select a reference potential 52 which is 90% of the difference. During "3" time, sampling circuit 10 scans the signal under test and applies the train of pulses to "early" and "late" comparator circuits 55 and 54 respectively. As the peak level of the train of pulses 17c crosses the level of reference potential 53, the "early" comparator 55 triggers and produces a store command pulse which instantaneously actuates first test limit storage device 70 and causes it to store the instantaneous magnitude of $V_s$ appearing at input 72. Similarly, as the peak level of the train of pulses 17c crosses the level of reference potential 52, the "late" comparator 56 triggers and produces a store command pulse which instantaneously actuates second test limit storage device 71 and causes it to store the instantaneous magnitude of $V_s$ appearing at input 73. The magnitudes stored correspond to the sampling voltage $V_s$ at the instant in time the signal was being sampled at its 10% and 90% levels. Since $V_s$ is also representative of time in the sampling cycle, the difference in stored voltages 81 at the output of the difference amplifier corresponds to the risetime of the signal under test and the voltage 81 may be applied to a meter 82 which is calibrated to read that time directly in time units, such as nanoseconds.

It will be apparent from the foregoing, that the system may easily be adapted to determine whether or not a level on a recurring signal at a particular time exceeds a predetermined percentage of the signal at that time. Thus, for example, it may be of interest to know only whether the 90% point on the signal pulse output of a semiconductor device exceeds a predetermined level within a given time. If it does, the semiconductor device may be acceptable for a certain purpose and if it does not, then it would be rejected. To make such a test, the signal would be sampled in the manner heretofore described setting up the initial and final levels of the signal, which are stored. The reference potential derived would be 90% of the difference in the stored voltages and this value is applied to a single comparator circuit. Then, instead of scanning the signal to produce a train of pulses, a third sample is taken at a preselected $V_s$ magnitude, which, of course, corresponds to a particular time. The last mentioned sample is compared with the 90% reference potential in the comparator circuit. If the third sample exceeds the reference potential, which would be indicated by the triggering of the comparator circuit, the signal from the semiconductor device has risen to a satisfactory level in the time corresponding to the magnitude of $V_s$. If the comparator circuit does not trigger, this indicates that the sample taken at the instant corresponding to the voltage magnitude $V_s$ has not risen to the 90% level. In this manner, it is possible to determine in digital concepts whether or not a circuit under test meets certain response characteristics without actually determining the analog value of those characteristics.

Where it is desired to measure the time interval occurring between a point or a first test limit on a first recurring signal and a point or second test limit on a second recurring signal, the system includes a delay measurement reset circuit 100, the details of which are described in connection with FIG. 5. Reset circuit 100 is illustrated in block diagram form in FIG. 10 where it is incorporated into a complete system and its relationship to the various components is shown. The purpose of delay reset measurement circuit is to enable the system to sample the first signal and to store the magnitude of $V_s$ corresponding to the first test limit in the first test limit storage device 70. Thereupon, the reset circuit 100 simultaneously maintains the first test limit storage device 70 at the first test limit level 77 which was stored when sampling the first signal, switches the input of the sampling circuit 10 to the second signal, recommences the cycle of operation of the sequencer circuit 25 and acts to keep the first test limit storage device 70 unaffected by the sampling operations to be performed on the second signal. The cycle of operation is repeated except that the "early" comparator 55 is not reset at "3" time. Therefore, only the "late" comparator is operative when sampling the second signal and the command pulse from the "late" comparator causes the second test limit to be stored in the second test limit storage device 71 in the usual manner. The difference in stored levels, being taken from the same ramp voltage $V_s$, is representative of the time interval between the first test limit on the first signal and the second test limit on the second signal.

Figure 5:
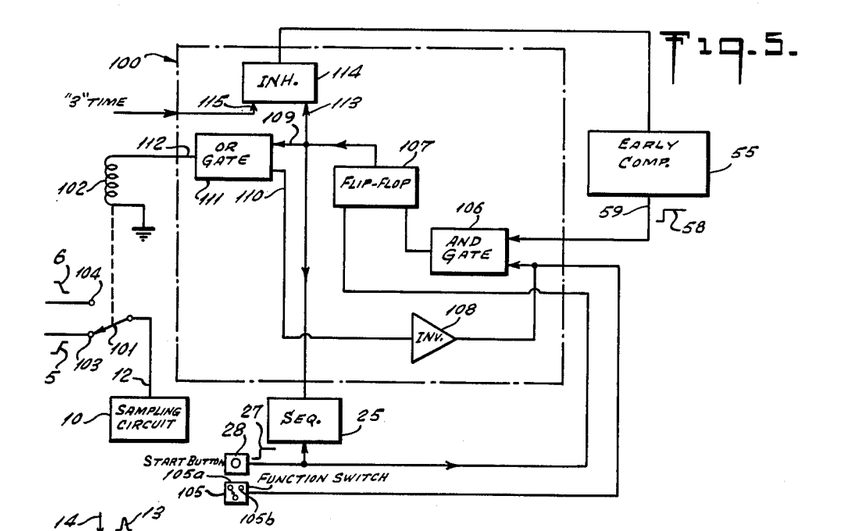
FIG. 5 illustrates a delay measurement reset circuit and its interconnections to other components of the system.

FIG. 5 illustrates the details of the preferred delay measurement reset circuit 100 and its connections to the other components of the system. For purposes of explanation, let it be assumed that it is desired to measure the turn-on time of a transistor which is the signal pulse 6 response to a reference pulse 5 input. The sampling circuit 10 is connected to its input 12 to the movable arm 101 of a coaxial relay 102. In its deenergized position, relay 102 causes the arm 101 to be connected to stationary contact 103 to which is fed reference pulse 5. When the relay 102 is energized, the movable arm 101 disconnects from contact 103 and connects to contact 104 leading from the signal pulse 6.

When making time interval measurements on one signal, function switch 105 is set to position 105a which produces a zero voltage output from switch 105. However, when making a delay measurement between two signals, as in the present example, function switch 105 is set to the position 105b which applies a positive pulse to the "and" gate 106. The output 59 of the early comparator 55 is also connected to an input of the "and" gate 106.

The operation and functioning of the delay measurement reset circuit is as follows. On the receipt of a start command 27, obtained by actuating start button 28, the sequencer 25 is set to operate. At this instant, since "early" comparator 55 has not yet produced a command pulse 58, "and" gate 106 is inactive. Start command 27 is applied to a flip-flop circuit 107 which causes the circuit 107 to have a zero output voltage. The positive voltage pulse from function switch 105 is also applied to an inverter 108, so that the output of the inverter 108 is also a zero voltage when making a delay measurement. The output of the flip-flop circuit 107 and the output of the inverter 108 are each connected to separate inputs 109 and 110 respectively of an "or" gate 111. Consequently, at the beginning of the cycle, there being no voltage at either of the inputs to the "or" gate 111, there is also no voltage at its output 112, which is connected to coaxial relay 102. Therefore, coaxial relay 102 is deenergized and movable arm 101 is connected to stationary contact 103, thereby applying reference pulse 5 to the input of sampling circuit 10. The circuits operate as heretofore described, sampling, storing "late" and "early" samples and selecting reference potentials to apply to the comparator circuits. During "3" time, on receipt of a store command 58 from the early comparator 55, the early storage device 70, in the usual manner, stores the instantaneous level of the sampling time voltage $V_s$ applied at input 72, which is the level corresponding to a sample taken at 10% of the reference pulse 5. Simultaneously, the store command pulse 58 is also applied to the "and" gate 106. The "and" gate 106, now having voltages applied at both the inputs, actuates the flip-flop circuit 107 which produces a positive voltage at its output. The positive voltage at the output of the flip-flop circuit 107 is employed to reset the sequencer 25 so that it recommences its cycle of operation beginning with "0" time. The output of the flip-flop 107 also energizes coaxial relay 102 through the "or" gate 111, thereby connecting the sampling circuit 10 to the input from the signal pulse 6. During "0" time, early and late peak sample storage circuits 35 and 34 are cleared and reset. The cycle of sampling begins again, this time, however, sampling the signal pulse 6. Early and late samples of the signal pulse are stored and reference potentials derived as a percentage of the difference. The potentiometer 50 is set to select 90% of the difference and apply it to the late comparator 54. When "3" time is reached, the late comparator 54 is reset in the usual manner. However, the positive pulse from the output of the flip-flop circuit 107 is also applied to one input 113 of an inhibitor 114. The other input 115 of the inhibitor 114 is the gating pulse 29 from channel 29d which ordinarily serves to reset the early comparator 55. Now, however, the "3" time gating pulse 29 is inhibited from resetting the early comparator 55. Therefore, the early comparator 55 continues to maintain its initial store command 58 and the first test limit storage device 70 retains its initial stored level 77. Only the late comparator 54 will cause a store command 60 to occur at its output 61 when the peaks of the sampled pulses 17c of signal pulse 6 cross the reference potential 52. The second test limit storage device 71 will, therefore, store the instantaneous level of the sampling time voltage $V_s$ appearing at input 73 at the instant of the store command 60. The stored level 79 is representative of the instant in time of the 90% point on the signal pulse 6, while the stored level 77 of the first test limit storage device 70 is representative of an instant in time corresponding to the occurrence of the 10% level of the reference pulse 5. The difference between the stored levels 77 and 79 corresponds to the turn-on time of the transistor being tested. In this manner, time intervals between two signals may be determined.

Figure 6:
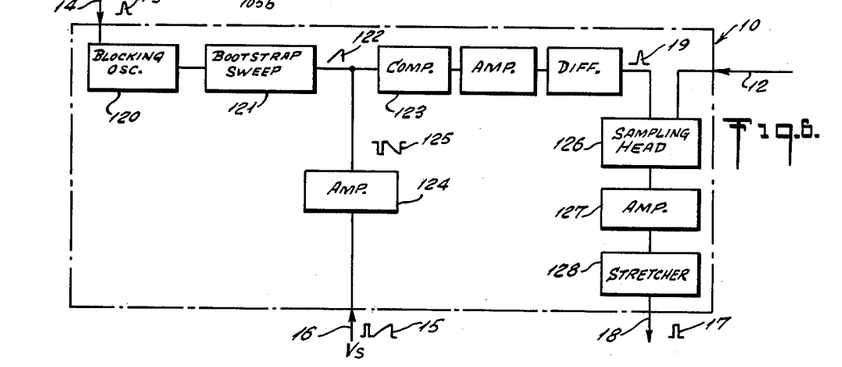
FIG. 6 illustrates a block diagram for a typical sampling circuit.

A preferred form of the sampling circuit 10 incorporating the means of delaying strobe pulse 19 by voltage $V_s$ is illustrated in FIG. 6. At input 14 to sampling circuit 10, the trigger pulse 13 is applied, which triggers a blocking oscillator 120 whose output is a gate which triggers a fast bootstrap sweep circuit 121. The output of the bootstrap sweep circuit 21 is a positive-going fast ramp voltage 122 rising to its peak in a very short time, for example 100 volts in approximately 100 nanoseconds. This fast ramp 122, one of which occurs for each trigger pulse 13, is applied to the grid of a comparator tube 123 having a fixed reference voltage on its cathode. The output, $V_s$, of the sampling time voltage generator 30 is applied to sampling circuit 10 at input 16. $V_s$ is then coupled to an amplifier 124 where the sampling time voltage $V_s$ is amplified and inverted to form a negative-going voltage 125 which is then also applied to the grid of the comparator tube 123. The negative-going voltage 125, being obtained from $V_s$, is a very slow changing voltage, for example, in the order of milliseconds, compared to the fast ramp 122. Consequently, to the fast ramp 122, negative-going voltage 125 appears to be a steady state voltage during any particular fast ramp sweep. The instantaneous level of the algebraic sum of the positive-going fast ramp 122 super-imposed on the negative-going voltage 125 at comparator tube 123 is triggered and therefore when a strobe pulse will be generated. Comparator tube 123, when triggered, generates the strobe pulse which is delayed in time with respect to trigger pulse 13. The lower the level (more negative) of the negative-going voltage 125 on which the fast ramp 122 is superimposed, the longer it takes for the fast ramp 122 to reach the trigger level of comparator tube 123. Successive lowering of negative-going voltage 125, which, it will be noted, is the same as increasing the magnitude of $V_s$, produces successive delays in strobe pulse time in relation to the trigger pulse 13. The strobe pulse output of the comparator tube 123 is amplified, differentiated and clipped, to form a sharp narrow pulse of approximately 0.5 ns. in width. It is then applied to the sampling head 126 where it is mixed with the signal under test. The strobe pulse 19 gates the sampling head and allows the instantaneous height of the signal under test to modulate the strobe pulse thereby providing a signal modulated strobe pulse output which is fed to a linear amplifier 127 and then to a stretcher-amplifier 128. The stretcher-amplifier 128 serves to stretch the narrow pulse in time, to approximately one millisecond. The modulated, amplified and stretched pulse is the output 17 of sampling circuit 10. By scanning the input signal, the output 17 is, therefore, a train of pulses having an envelope 20 which preserves the shape of the signal waveform but is considerably stretched or "slowed down" in time.

The late sample peak storage circuit 24 and the early sample peak storage circuit 35 are each of the type which detect and store the peak input voltage level at the instant that the circuits receive the appropriate store command, or gating pulse 29 during "1" time and "2" time respectively. Once the gating pulse 29 has been applied, the output of the circuit is a voltage maintained at a constant level and is unaffected by the subsequent change in the input to the circuit or by the disappearance of the gating pulse. The late sample peak storage circuit 34 and the early sample peak storage circuit 35 are cleared only upon receipt of another gating pulse 29, usually during "0" time, which is applied to the circuit for resetting purposes at the initiation of the sequencing cycle.

The purpose of the early and late sample peak storage circuits 35, 34 is to determine automatically one or more levels from which one or more reference potentials can be derived. By utilizing the pulse sampling technique and working with percentages of voltages, it is possible to eliminate many of the inherent inaccuracies contained in prior art measuring systems. However, when the initial and final signal levels are known and need not be established, or where it is desired to establish arbitrary levels, it is, of course, possible to incorporate into the system of the invention a means for bypassing the early and late sample peak storage circuits 35, 34, or to omit them completely from the system. In such a case, a voltage corresponding to the difference voltage between the initial and final levels of the signal voltage or the arbitrary level or levels, can be applied directly to potentiometers 50 and 51 from which the reference potentials may be derived. In fact, if it is desired, one or more reference potentials can be set up and applied directly to the comparator circuits without employing any potentiometer or other means for deriving the reference potential.

The first test limit storage device 70 and the second test limit storage device 71 preferably are of the type which produce a constant output level only during the period when the device receives a store command. Upon the disappearance of the store command, the first and second test limit storage devices 70 and 71 are cleared of the level which they have detected and stored.

Figure 7:
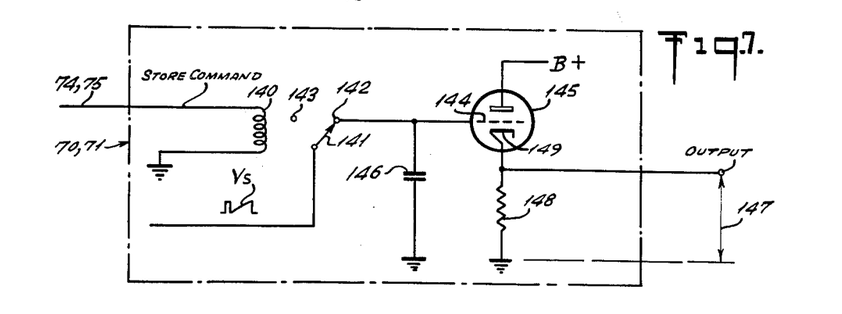
FIG. 7 illustrates a preferred test limit storage circuit.

The preferred circuit for the first and second test limit storage devices 70 and 71 is illustrated in FIG. 7. Relay coil 140 in each test limit storage device, is connected between the output of the comparator circuit and ground. On receipt of a store command, relay 140 is energized and movable arm 141 disconnects from stationary contact 142 and connects to stationary contact 143. In the deenergized position of relay 140, movable arm 141 connects the sampling time voltage $V_s$ to the grid 144 of a cathode follower tube 145. Grid 144 is also connected to ground through a capacitor 146. The output 147 of the cathode follower 145 is taken across resistance 148 connected between the cathode 149 and ground. In operation, the movable arm 141 ordinarily is connected to charge capacitor 146 to the same level as the instantaneous magnitude of voltage $V_s$. On receipt of a store command during '3" time, relay coil 140 becomes energized. Arm 141 disconnects the output $V_s$ of the sampling time voltage generator 30 from the grid of the cathode follower tube 145 and thereupon the capacitor 146, which had been charged to the level of $V_s$ at the instant of disconnect, maintains the level to which it is charged. Accordingly, since the voltage applied to the grid 144 of the cathode follower 145 is constant, the output 147 across the resistance 148 is also maintained constant and represents the instantaneous value of the sampling time voltage $V_s$ at the instant the relay coil 140 was energized. The output 147 across the resistance 148 is maintained until the relay coil 140 is deenergized, which preferably occurs at the beginning of "3" time of the next succeeding cycle, at which time the comparator circuit is reset and the store command pulse is removed.

It should be noted that although the preferred embodiment of the system of the invention incorporates the first and second test limit storage devices 70, 71 which store significant levels of the sampling time voltage $V_s$, as heretofore described, the command pulse output from each comparator occurs at an instant of time in the envelope reproducing the signal shape that is proportional to the instant of time in the real signal at which a time measurement is desired. Therefore, the command pulses themselves can be employed in numerous ways to indicate time by coupling the command pulses to appropriate time indicating circuits which are capable of indicating the time interval between output command pulses. Thus, for example, the output of the comparator circuits may be used to start and stop any electronic timing device, such as an independent external ramp voltage or a clock counter counting the trigger pulses 13 in the system or counting aritficially generated pulses.

Where the desired time interval being measured is between points on signals, which, when scanned, result in a succession of peak output voltages that are increasing in amplitude, there is no particular difficulty in causing the comparator circuits to trigger at an instant when the sampled train of pulses 17c first exceeds the reference potential input to the comparator. However, in the present invention, it is desired to have a comparator circuit which will be sensitive to the instant that the peaks of the train of pulses 17c first cross the reference potential input to the comparator regardless of whether the train of pulses 17c is increasing in amplitude or decreasing in amplitude. The direction of the signal or of the peaks of the train of pulses may be referred to as the polarity of the waveform, the polarity being positive or positive-going for waveforms increasing in amplitude and negative or negative-going for waveforms decreasing in amplitude. Therefore, for effecting measurements on both positive-going and negative-going signals, the system must be capable of detecting the general direction of the scanned output and set up the comparator circuit to be responsive to the instant the pulse peaks 17c either exceed the reference potential for a positive-going train of pulses, or drop below the reference potential for a negative-going train of pulses. A preferred circuit and method for accomplishing this will now be described with reference to FIGS. 8 and 9.

Figure 8:
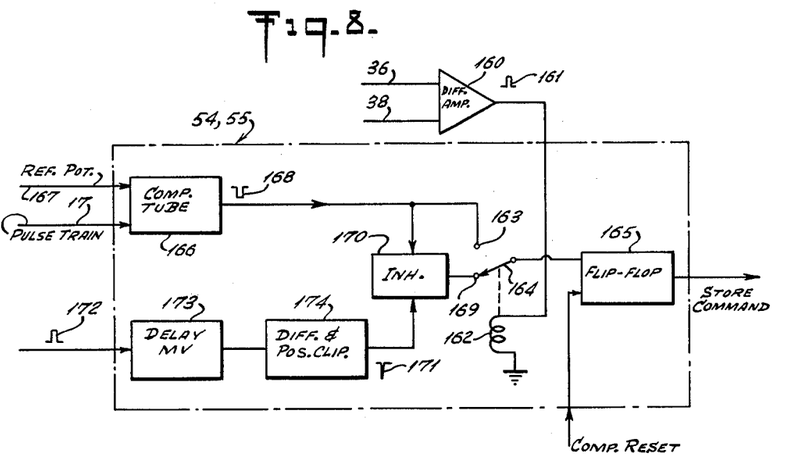
FIG. 8 illustrates in block diagram form a polarity detection circuit incorporated in the comparator circuit.
Figure 9:
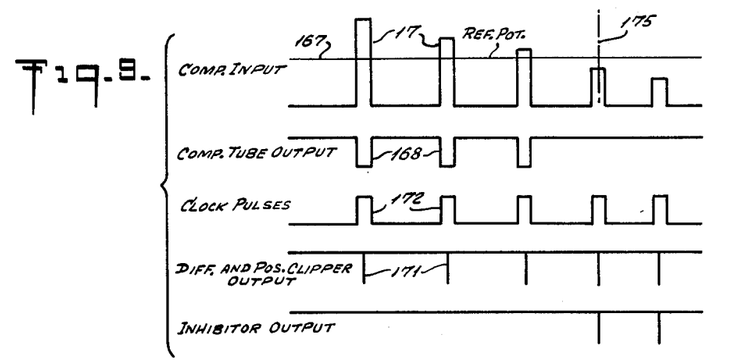
FIG. 9 is a timing diagram illustrating the relationships of the waveforms of pulses appearing at the various components of FIG. 8 when a negative-going train of pulses is applied to the comparator circuit.

The polarity of the train of pulses corresponding to the signal under test is sensed by a differential amplifier 160 which is connected between the output 36 of the plate sample peak storage circuit 34 and the output 38 of the early sample peak storage circuit 35. If the train of pulses is positive-going, the output of the differential amplifier 160 is a positive pulse 161 which may be employed to energize a relay coil 162. If the train of pulses is negative-going, the output of the differential amplifier 160 is zero and relay coil 162 is deenergized.

In the energized condition of relay coil 162 (positive-going waveforms), stationary contact 163 is connected to movable arm 164 which connects flip-flop circuit 165 to the output of a conventional comparator tube 166. Applied to the comparator tube 166 are the reference potential 167 and the train of sampling pulses 17. When a peak of the train of sampling pulses 17 first exceeds the reference potential 167, the comparator tube 166 triggers and produces a neagtive pulse output 168 which actuates the flip-flop circiut 165, instantaneously producing thereby, the store command applied to the limit storage device. When the train of pulses is negative-going, that fact is detected by the differential amplifier 160, which produces a zero output. Relay coil 162 is, therefore, deenergized and arm 164 is in its normal position connected to stationary contact 169 leading to an inhibitor 170. The negative pulse output 168 of comparator tube 166 is employed as the inhibit input to the inhibitor 170. The other input to the inhibitor 170 is a negative pulse 171 which occurs approximately in the middle of the time period of each one of the sampling pulses 17. Negative pulse 171 is obtained by applying a clock pulse 172 to a delay multi-vibrator 173 and then to a differentiating and positive clipper circuit 174. Therefore, for each one of the sampling pulses 17, negative pulse 171 appears at the input to inhibitor 170. If the sampled pulse train 17 is negative-going, the peak of the first pulse will exceed the reference potential 167 and the comparator tube 166 will have a negative pulse output 168 which acts to inhibit the negative pulse 171 from feeding through inhibitor 170. Therefore, the flip-flop circuit 165 will not be actuated. As soon as the peak of the sampled pulse train 17 drops below the reference potential 167, shown in FIG. 9 as first occurring at instant of time 175, comparator tube 166 will no longer trigger, and negative pulse output 168 will no longer appear at the input to inhibitor 170. Inhibitor 170 will therefore allow negative pulse 171 to pass. Consequently, the flip-flop circuit 165 will be actuated at the instant that the peak of the sampled pulse train 17 drops below the reference potential 167. Flip-flop circuit 165 is reset by a comparator reset which may be the "3" time pulse for the late compartor 54 or the resetting pulse derived from reset circuit 100 for the early comparator 55. In this manner, the system is capable of sensing automatically and virtually simultaneously, time intervals on either positive-going or negative-going signals, or both types of signals during the course of the same time interval measurement, without the necessity for any prior adjustment.

Figure 10:
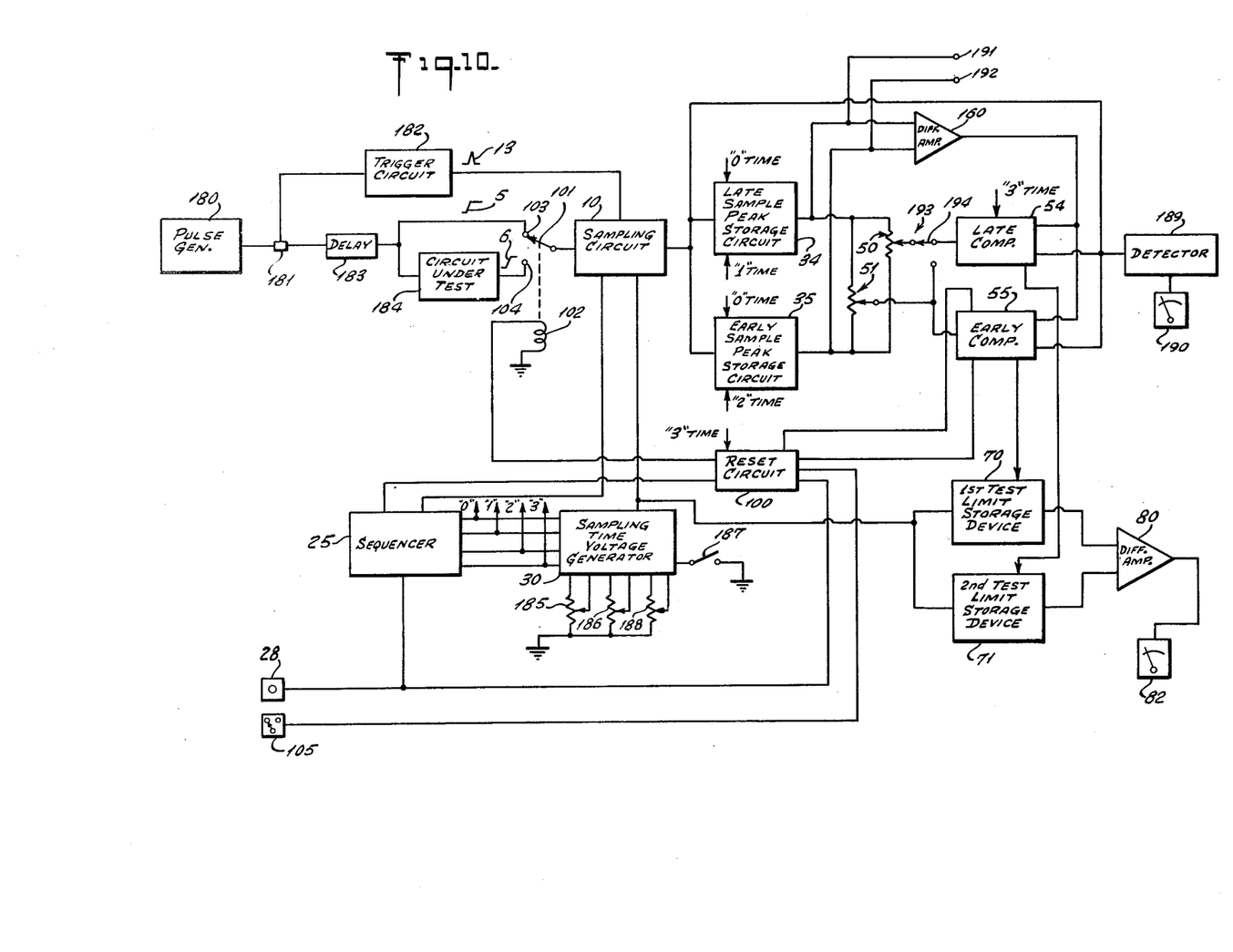
FIG. 10 illustrates a block diagram of a complete electronic time interval measuring system.

A complete electronic system for measuring time intervals including circuits for triggering the devices under test, is shown in FIG. 10. To actuate the device under test, a pulse generator 180 generates pulses which may occur, for example, at the rate of 120 pulses per second. The output of the pulse generator 180 is connected to a non-loading take-off T 181, one branch of which may be applied to a trigger circuit 182 and the other branch applied to a delay network 183. The delay network 183 is required in order that the signal pulse applied to the sampling head may be delayed to allow sufficient time to enable the output of the pulse generator 180 to be acted on by both the trigger circuit 182 and the sampling circuit 10 and still reach the sampling head simultaneously with the signal pulse. The trigger circuit 182 is employed for the purpose of sharpening and shaping the pulse to produce the required trigger pulse 13 for use in the sampling circuit 10. The output of the delay network 183 is employed to drive the circuit under test 184, which may be, for example, a transistor in a test circuit, to produce the signal pulse 6. The output of the delay network 183 is also applied directly to one stationary contact 103 of coaxial relay 102 having movable arm 101. The other stationary contact 104 couples to the signal pulse 6. The arm 101 therefore, provides for the connection of either reference pulse 5 or signal pulse 6 to the sampling circuit 10, depending on the condition of the coaxial relay 102.

The delay measurement reset circuit 100 is also shown included in the complete system in FIG. 10. When it is desired to make a delay measurement between two signals, function switch 105 is set in one position to apply a positive voltage to reset circuit 100. If the time interval being measured is on one unidirectional signal, function switch 105 is set in a different position so as not to be connected to any potential. In the latter position, the relay 102 will be deenergized and the arm 101 will be connected to the contact 104 throughout the test, thereby sampling only pulses from the circuit under test 184.

The sampling time voltage generator 30 may have manually adjustable controls 185 and 186 for presetting the magnitude of the sampling time voltage during "1" time and "2" time respectively. In addition, a manual scan switch 187 preferably is provided to disconnect the sampling time voltage generator 30 from control by the sequencer circuit 25. When manual scan switch 187 is closed, the magnitude of the sampling time voltage is controllable from manual scan potentiometer 188 and the operator is able to scan the signal being analyzed at will by adjusting manual scan potentiometer 188, reading the output of the sampled pulses at a detector 189 or a meter 190, connected to the output of the sampling circuit 10. In this way, the final and initial levels of the signal under test can be determined. By marking "1" time and "2" time controls, 185 and 186 with calibrations equal to the calibrations on scan potentiometer 188, it is a relatively simple matter to set the controls 185 and 186 to cause the sampling time voltage generator 30 to produce the desired output during "1" time and "2" time.

It is understood that the particular number of time periods set up by the sequencer 25 and the particular sequence for controlling the sampling time voltage generator 30 have been selected as the preferred method of practicing the invention. However, any number of time periods may be set up to attain the desired results for a particular measurement. Moreover, employing the principles of the invention, any sequence of sampling is possible. Consequently, it would be possible to sample, for example, the initial level of the signal first, then the final level and then scan by either a rising ramp or a falling ramp voltage. Or, if desired, a sampling sequence may be set up employing a series of three time periods such as a sample during the initial level, a sample during the final level and a sample intermediate the initial and final levels. Where the signal under analysis includes variations due to noise contained in the signal, it may be advisable to design a sampling sequence so that one or more samples may be taken at any level. Thus, for instance, it would be possible to take five samples at the final signal level, add the sampled pulses and average them before applying the average pulse to the peak storage circuit. In this way, the possibility of errors arising from sampling on a random noise peak in the signal would be minimized. It is seen, therefore, that the number of time periods and the particular sampling sequence can be varied to suit the requirements of any type of measurement without departing from the principles of the invention.

If desired, an oscilloscope (not shown) may also be connected to the output of the sampling circuit 10, so that the sampled signal may be displayed on a screen for visual analysis.

The output of the late sample peak storage circuit 34 and the early sample peak storage circuit 35 may also be brought out to terminals 191 and 192 to provide the operator with an indication of the total swing from the initial to the final level of the signal under test.

The complete system may also include a switch 193 at the input to the late comparator 54 which is manually operable and which allows the reference potential to the late comparator to be obtained from either potentiometer 50 or potentiometer 51. In this way, when making a delay measurement from the 10% level on one signal to the 10% level on a second signal, for example, movable arm 194 may be connected to potentiometer 51 so that a 10% reference potential is applied to both early and late comparators 54 and 55.

Figure 11:
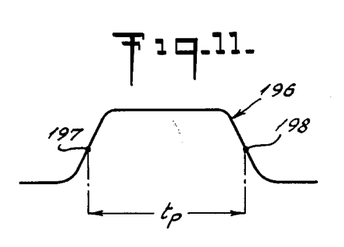
FIG. 11 illustrates a signal, having both rising and decreasing amplitudes, on which the pulse width time is indicated.

The system may be employed to measure time intervals on unidirectional signals and signals which have both rising and decreasing amplitudes. Thus, for example, it is often of interest to know the pulse width of a signal 196 such as that illustrated in FIG. 11. The pulse width may be the time interval $t_p$ between the 50% levels of the signal, represented in FIG. 11 as the time between points 197 and 198. For such a measurement, the system is sampled in the usual manner heretofore described. However, a reset circuit which would be apparent to those skilled in the art and which is similar to the reset circuit described in connection with a time delay measurement between two signals, is employed having two conditions. In the first condition, the reset circuit would deactivate the second test limit storage circuit while the signal is being sampled across the first test limit 197. Similarly, in its second condition, the reset circuit would be designed to maintain the stored level of the sampling time voltage generator 30 corresponding to test limit 197 while allowing the signal to be sampled across the second test limit 198. The late comparator would then trigger as test limit 198 is being sampled and, in the usual manner, the difference in stored voltage levels of $V_s$ would correspond to the pulse width time.

Figure 12:
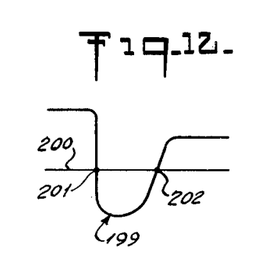
FIG. 12 illustrates a signal and a fixed D.C. voltage level crossing the signal.

At times it may be of interest to know the time interval between points on a signal corresponding to the signal amplitudes at which it crosses and recrosses a fixed D.C. voltage level. Such a signal 199 is shown in FIG. 12. Obviously, the system may be designed to apply the D.C. voltage level 200 directly as a reference potential, or the D.C. voltage level may be applied to the sampling circuit and the reference potential may be established by sampling methods. If sampling methods are employed, it would be necessary, of course, to design the system with appropriate switching devices so that first the D.C. level 200 can be sampled and the reference potential established. Then the sampling could be switched to the signal 199 under analysis. The time interval between points 201 and 202 on the D.C. voltage level 200 could then be determined in the manner heretofore described.

It will thus be seen that the objects set forth above, among those made apparent from the preceding description, are efficiently attained and, since certain changes may be made in carrying out the above method and in the system set forth without departing from the scope of the invention, it is intended that all matter contained in the above description or shown in the accompanying drawings shall be interpreted as illustrative and not in a limiting sense.

Having described our invention, what we claim as new and desire to secure by Letters Patent is:

1. An electronic time interval measuring system for measuring the time interval between two voltage levels on recurring signals, comprising, in combination, means for applying the recurring signals to the system, a voltage generator circuit having a voltage output, sampling circuit means connected to the signal applying means and connected to the voltage generator output and being adapted to sample the recurring signals to derive therefrom a peak output voltage having an amplitude representative of the amplitude of the signal at the instant of sampling, said sampling circuit means having means for controlling the instant of sampling by the magnitude of a voltage, said voltage being the output of the voltage generator circuit, means for controlling the magnitude of the voltage generator circuit output, first and second storage means connected to the output of the sampling circuit means adapted to detect and store the peak output voltage level of the sampling circuit means at a first and second predetermined instant of the sampling cycle, means adapted to derive from the first and second storage means a first and second reference potential corresponding to the signal voltage levels between which the time interval is desired to be measured, first comparator circuit means connected to the output of the sampling circuit means and having applied thereto said first reference potential, said first comparator circuit means being adapted to have an output command pulse when a succession of peak output voltages of the sampling circuit means crosses the first reference potential, second comparator circuit means connected to the output of the sampling circuit means and having applied thereto said second reference potential, said second comparator circuit means being adapted to have an output command pulse when a succession of peak output voltages of the sampling circuit means crosses the second reference potential, and time indicating circuit means connected and responsive to the output command pulses from said first and second comparator circuit means whereby the interval between the output command pulses is indicated, said interval being representative of the time interval desired to be measured.

2. An electronic time interval measuring system for measuring the time interval between two voltage levels on recurring signals, comprising, in combination, means for applying the recurring signals to the system, a voltage generator circuit having a voltage output, sampling circuit means connected to the signal applying means and connected to the voltage generator output and being adapted to sample the recurring signals to derive therefrom a peak output voltage having an amplitude representative of the amplitude of the signal at the instant of sampling, said sampling circuit means having means for controlling the instant of sampling by the magnitude of a voltage, said voltage being the output of the voltage generator circuit, means for controlling the magnitude of the voltage generator circuit output whereby the magnitude of said voltage generator output is representative of an instant of time in the cycle of the recurring signals, first and second storage means connected to the output of the sampling circuit means adapted to detect and store the peak output voltage level of the sampling circuit means at a first and second predetermined instant of the sampling cycle, means adapted to derive from the first and second storage means at least one reference potential corresponding to level on a signal voltage waveform between which the time interval is desired to be measured, comparator circuit means connected to the output of the sampling circuit means and having applied thereto the derived reference potentials, said comparator circuit means being adapted to have an output command pulse when a succession of peak output voltages of the sampling circuit means crosses each of said reference potentials, and time indicating circuit means connected and responsive to each output command pulse from said comparator circuit means whereby the interval between output command pulses is established, said interval being representative of the interval desired to be measured.

3. In an electronic time interval measuring system for measuring the time interval between two voltage levels on recurring signals wherein the initial and final levels of the recurring signals are known, means for applying the recurring signals to the system, a voltage generator circuit having a voltage output, sampling circuit means connected to the signal applying means and connected to the voltage generator output and being adapted to sample the recurring signals to derive therefrom a peak output voltage having an amplitude representative of the amplitude of the signal at the instant of sampling, said sampling circuit means having means for controlling the instant of sampling by the magnitude of a voltage, said voltage being the output of the voltage generator circuit, means for controlling the magnitude of the voltage generator circuit output, whereby the magnitude of said voltage generator output is representative of an instant of time in the cycle of the recurring signals, first and second comparator circuit means connected to the output of the sampling circuit means, means for applying fixed first and second reference potentials corresponding to the signal levels between which the time interval is desired to be measured to said first and second comparator circuit means respectively, said first and second comparator circuit means each being adapted to have an output command pulse when a succession of peak output voltages of the sampling circuit means crosses said fixed first and second reference potentials respectively and time indicating circuit means connected and responsive to the output command pulses from said first and second comparator circuit means whereby the interval between the output command pulses is indicated, said interval being representative of the time interval desired to be measured.

4. An electronic time interval measuring system for measuring the time interval between two voltage levels on recurring signals, comprising, in combination, means for applying the recurring signals to the system, a voltage generator circuit having a voltage output, sampling circuit means connected to the signal applying means and connected to the voltage generator output and being adapted to sample the recurring signals to derive therefrom a peak output voltage having an amplitude representative of the amplitude of the signal at the instant of sampling, said sampling circuit means having means for controlling the instant of sampling by the magnitude of a voltage, said voltage being the output of the voltage generator circuit, means for controlling the magnitude of the voltage generator circuit output, whereby the magnitude of said voltage generator output is representative of an instant of time in the cycle of the recurring signals, first and second storage means connected to the output of the sampling circuit means adapted to detect and store the peak output voltage level of the sampling circuit means at a first and second predetermined instant of the sampling cycle, means adapted to derive from the first and second storage means a first and second reference potential corresponding to the signal voltage levels between which the time interval is desired to be measured, first comparator circuit means connected to the output of the sampling circuit means and having applied thereto said first reference potential, said first comparator circuit means being adapted to have an output command pulse when a succession of peak output voltages of the sampling circuit means crosses the first reference potential, second comparator circuit means connected to the output of the sampling circuit means and having applied thereto said second reference potential, said second comparator circuit means being adapted to have an output command pulse when a succession of peak output voltages of the sampling circuit means crosses the second reference potential, third storage means connected to the output of first comparator circuit means and connected to the output of the voltage generator circuit, said third storage means being adapted to detect and store the instantaneous output voltage level of the voltage generator circuit at the instant when said first comparator circuit means produces an output command pulse, fourth storage means connected to the second comparator circuit means and connected to the output of the generator circuit, said fourth storage means being adapted to detect and store the instantaneous output voltage level of the voltage generator circuit at the instant when said second comparator circuit means produces an output command pulse and indicating means connected between said third and fourth storage means responsive to the difference voltage between said stored voltage levels, said difference voltage being representative of the time interval desired to be measured.

5. An electronic time interval measuring system as defined in claim 4 in which the voltage generator circuit includes manually adjustable means for selectively varying the voltage generator output thereby providing manual control of the instant of sampling.

6. An electronic time interval measuring system as defined in claim 4 including polarity detector circuit means associated with the first and second comparator circuit means and adapted to cause said comparator circuit means to be responsive to that peak output voltage first exceeding the reference potential when the succession of peak output voltages is increasing in amplitude and to be responsive to the peak output voltage first less than the reference potential when the succession of peak output voltages is decreasing in amplitude.

7. An electronic time interval measuring system as defined in claim 4 in which the means for applying the recurring signals to the system includes a source of recurring signals derived from an electrical circuit under test and includes a pulse generator circuit adapted to drive the electrical circuit under test.

8. An electronic time interval measuring system for measuring the time interval between two voltage levels on recurring signals, comprising, in combination, a source of recurring signals, sampling circuit means coupled to said source and being adapted to sample the recurring signals to derive therefrom a peak output voltage having an amplitude representative of the amplitude of the signal at the instant of sampling, sequencing circuit means for generating gating pulses on a plurality of channels arranged in a predetermined time sequence, a voltage generator circuit connected to the sequencing circuit means, said voltage generator being adapted to provide during each predetermined time sequence a prearranged voltage output, the voltage output of the voltage generator circuit being connected to the sampling circuit means, said sampling circuit means being responsive to the magnitude of the voltage generator circuit output, whereby the magnitude of said voltage output is representative of an instant in time in the cycle of the recurring signals, first and second storage means connected to the output of the sampling circuit means adapted to detect and store the peak output voltage level of the sampling circuit means at a first and second predetermined instant of the sampling cycle, means adapted to derive from the first and second storage means a first and second reference potential corresponding to the signal voltage levels between which the time interval is desired to be measured, first comparator circuit means connected to the output of the sampling circuit means and having applied thereto said first reference potential, said first comparator circuit means being adapted to have an output command pulse when a succession of peak output voltages of the sampling circuit means crosses the first reference potential, second comparator circuit means connected to the output of the sampling circuit means and having applied thereto said second reference potential, said second comparator circuit means being adapted to have an output command pulse when a succession of peak output voltage of the sampling circuit means crosses the second reference potential, third storage means connected to the output of first comparator circuit means and connected to the voltage generator circuit, said third storage means being adapted to detect and store the instantaneous output voltage level of the voltage generator circuit at the instant when said first comparator circuit means produces an output command pulse, fourth storage means connected to the second comparator circuit means and connected to the voltage generator circuit, said fourth storage means being adapted to detect and store the instantaneous output voltage level of the voltage generator circuit at the instant when said second comparator circuit means produces an output command pulse and indicating means connected between said third and fourth storage means responsive to the difference voltage between said stored voltage levels, said difference voltage being representative of the time interval desired to be measured.

9. An electronic time interval measuring system as defined in claim 8 in which the voltage generator circuit includes first and second selectively adjustable means each of said means being adapted to control the magnitude of the output of the voltage generator circuit whereby to set the first and second predetermined instants in the sampling cycle.

10. An electronic time interval measuring system as defined in claim 8 in which the sequencing circuit means is adapted to provide at least three gating pulses in a predetermined time sequence, the first of said gating pulses being adapted to provide a first voltage output from the voltage generator circuit and being adapted to activate the first storage means, the second of said gating pulses being adapted to provide a second voltage output from the voltage generator circuit and being adapted to activate the second storage means, and the third of said gating pulses being adapted to initiate a varying voltage output from the voltage generator circuit.

11. An electronic time interval measuring system for measuring the risetime of a switching signal, comprising, in combination, means for applying the switching signal to the system, a voltage generator circuit having voltage output, sampling circuit means connected to the signal applying means and coupled to the voltage generator output, said sampling circuit means being adapted to sample instantaneously the switching signals to derive therefrom a peak pulse output voltage having an amplitude representative of the amplitude of the switching signal at the instant of sampling, said sampling circuit means having means for controlling the instant of sampling by the magnitude of a voltage, said voltage being the output of the voltage generator circuit, means for selectively adjusting the magnitude of the voltage generator circuit output whereby the magnitude of said voltage generator output is representative of an instant of time in the cycle of the switching signal, first and second storage means connected to the output of the sampling circuit means adapted to detect and store the peak pulse output voltage of the sampling circuit means, said first storage means being adapted to store the peak pulse output voltage at an instant when the switching signal is approximately at its final level, said second storage means being adapted to store the peak pulse output voltage at an instant when the switching signal is approximately at its initial level, potentiometer means connected across the output of the first and second storage means and adapted to tap off a first reference potential corresponding to approxiamtely 10% and a second reference potential corresponding to approximately 90% of the difference between the stored voltage levels across the first and second storage means, a first comparator circuit means connected to the output of the sampling circuit means and having applied thereto said first reference potential, said first comparator circuit means being adapted to have an output command pulse when a succession of peak output voltages of the sampling circuit means crosses the first reference potential, second comparator circuit means connected to the output of the sampling circuit means and having applied thereto said second reference potential, said second comparator circuit means being adapted to have an output command pulse when a succession of peak output voltages of the sampling circuit means crosses the second reference potential, third storage means connected to the output of first comparator circuit means and connected to the output of the voltage generator circuit, said third storage means being adapted to detect and store the instantaneous output voltage level of the voltage generator circuit at the instant when said first comparator circuit means produces an output command pulse, fourth, storage means connected to the second comparator circuit means and connected to the output of the voltage generator circuit, said fourth storage means being adapted to detect and store the instantaneous output voltage level of the voltage generator circuit at the instant when said second comparator circuit means produces an output command pulse and indicating means connected between said third and fourth storage means responsive to the difference voltage between said stored voltage levels, said difference voltage being representative of the time interval desired to be measured.

12. An electronic time interval measuring system for measuring the time delay between a point on a first recurring signal and a point on a second recurring signal, comprising, in combination, means for applying the recurring signals to the system, a voltage generator circuit having a voltage output, sampling circuit means connected to the voltage generator output and to the signal applying means and being adapted to sample the recurring signals to derive therefrom a peak output voltage having an amplitude representative of the amplitude of the signal at the instant of sampling, said sampling circuit means having means for controlling the instant of sampling by the magnitude of a voltage, said voltage being the output of the voltage generator circuit, means for controlling the magnitude of the voltage generator circuit output, whereby the magnitude of said voltage generator output is representative of an instant of time in the cycle of the recurring signals, switching means connecting either the first signal or the second signal to the sampling circuit means, first and second storage means connected to the output of the sampling circuit means, said first and second storage means being adapted to detect and store the peak output voltage level of the sampling circuit means at a first and second predetermined instant of the sampling cycle respectively and to derive therefrom a first and second reference potential corresponding to fixed percentages of the difference between said stored peak output voltage levels, first comparator circuit means connected to the output of the sampling circuit means and having applied thereto said first reference potential, said first comparator circuit means being adapted to have an output command pulse when a succession of peak output voltages of the sampling circuit means crosses the first reference potential, third storage means connected to the output of first comparator circuit means and connected to the voltage generator circuit, said third storage means being adapted to be activated to detect and store the instantaneous output voltage level of the voltage generator circuit at the instant when said first comparator circuit means produces an output command pulse, a delay measurement reset circuit being adapted to be activated after the third storage means is activated, to operate the switching means, to maintain the third storage means in its activated condition and to reset the first and second storage means, second comparator circuit means connected to the output of the sampling circuit means and having applied thereto said second reference potential, said second comparator circuit means being adapted to have an output command pulse when a succession of peak output voltages of the sampling circuit means crosses the second reference potential, fourth storage means connected to the second comparator circuit means and connected to the voltage generator circuit, said fourth storage means being adapted to detect and store the instantaneous output voltage level of the voltage generator circuit at the instant when said second comparator circuit means produces an output command pulse and indicating means connected between said third and fourth storage means responsive to the difference voltage between said stored voltage levels, said difference voltage being representative of the time interval desired to be measured.

13. An electronic time interval measuring system as defined in claim 12 in which the second recurring signals are derived from a circuit under test and which includes a pulse generator as a source of the first recurring signals, said pulse generator being adapted to drive the circuit under test.

14. An electronic time interval measuring system as defined in claim 12 including sequencing circuit means for generating gating pulses on a plurality of channels arranged in a predetermined time sequence, said sequencing circuit means being connected to the voltage generator circuit and adapted to provide during each predetermined time sequence a prearranged controlled voltage output, and said sequencing circuit means being adapted to be reset from the delay measurement reset circuit to recommence its sequencing cycle after the third storage means is activated.

15. An electronic time interval measuring system for measuring the time interval between a first point and a second point on a recurring signal, comprising, in combination, means for applying the recurring signal to the system, a voltage generator circuit having a voltage output, sampling circuit means connected to the voltage generator output and being adapted to sample the recurring signal to derive therefrom a peak output voltage having an amplitude representative of the amplitude of the sampled signal at the instant of sampling, said sampling circuit means having means for controlling the instant of sampling by the magnitude of a voltage, said voltage being the output of the voltage generator circuit, means for controlling the magnitude of the voltage generator circuit output, whereby the magnitude of the voltage generator output is representative of an instant of time in the cycle of the recurring signal, first and second storage means connected to the output of the sampling circuit means, said first and second storage means being adapted to detect and store the peak output voltage of the sampling circuit means at first and second predetermined instants of the recurring signal respectively and to derive therefrom a reference potential corresponding to the first point on the recurring signal, first and second comparator circuit means connected to the output of the sampling circuit means and having applied thereto said reference potential, said first and second comparator circuit means being adapted to be capable of having an output command pulse when a succession of peak output voltages of the sampling circuit means crosses the amplitude of the reference potential, third storage means connected to the output of the first comparator circuit means and connected to the voltage generator circuit, said third storage means being adapted to be activated to detect and store the instantaneous output voltage level of the voltage generator circuit at the instant said first comparator circuit means produces an output command pulse, fourth storage means connected to the output of the second comparator circuit means and connected to the voltage generator circuit, said fourth storage means being adapted to be activated to detect and store the instantaneous output voltage level of the voltage generator circuit at the instant when said second comparator circuit means produces an output command pulse, reset circuit means having a first and second condition and being adapted to maintain the fourth storage means in a deactivated state when said reset circuit means is in said first condition and being adapted to maintain the third storage means in its activated state when said reset circuit means is in said second condition, said reset circuit means being adapted to change from said first condition to said second condition at the time when said third storage means is activated and indicating means connected between said third and fourth storage means responsive to the difference voltage between said stored voltage levels, said difference voltage being representative of the time interval desired to be measured.

16. An electronic time interval measuring system for measuring the time interval between a first point and a second point on recurring signals, comprising, in combination, means for applying the recurring signals to the system, a voltage circuit having a voltage output, sampling circuit means connected to the voltage generator output and being adapted to sample the recurring signals to derive therefrom a peak output voltage having an amplitude representative of the amplitude of the sampled signal at the instant of sampling, said sampling circuit means having means for controlling the instant of sampling by the magnitude of a voltage, said voltage being the output of the voltage generator circuit, means for controlling the magnitude of the voltage generator circuit output, whereby the magnitude of the voltage generator output is representative of an instant of time in the cycle of recurring signals, a reference potential source, first and second comparator circuit means connected to the output of the sampling circuit means and having applied thereto said reference potential, said first and second comparator circuit means being adapted to be capable of having an output command pulse when a succession of peak output voltages of the sampling circuit means crosses the amplitude of the reference potential, one storage means connected to the output of the first comparator circuit means and connected to the voltage generator circuit, said storage means being adapted to be activated to detect and store the instantaneous output voltage level of the votlage generator circuit at the instant said first comparator circuit means produces an output command pulse, another storage means connected to the output of the second comparator circuit means and connected to the voltage generator circuit, said storage means being adapted to be activated to detect and store the instantaneous output voltage level of the generator circuit at the instant when said second comparator circuit means produces an output command pulse, reset circuit means having a first and second condition and being adapted to maintain the other storage means in a deactivated state when said reset circuit means is in said first condition and being adapted to maintain the one storage means in its activated state when said reset circuit means is in said second condition, said reset circuit means being adapted to change from said first condition to said second condition at the time when said one storage means is activated and indicating means connected between the storage means responsive to the difference voltage between said stored voltage levels, said difference voltage being representative of the time interval desired to be measured.

17. An electronic measuring system for determining whether a level on a recurring signal at a predetermined instant of time exceeds a predetermined level comprising, in combination, means for applying the recurring signal to the system, a voltage generator circuit having a voltage output, sampling circuit means connected to the voltage generator output and being adapted to sample the recurring signal to derive therefrom a peak output voltage having an amplitude representative of the amplitude of the signal at the instant of sampling, said sampling circuit means having means for controlling the instant of sampling by the magnitude of a voltage, said voltage being the output of the voltage generator circuit, means for controlling the magnitude of the voltage generator circuit output, whereby the magnitude of said voltage generator output is representative of an instant of time in the cycle of the recurring signal, first and second storage means connected to the output of the sampling circuit means adapted to detect and store the peak pulse output voltage level of the sampling circuit means at a first and second predetermined instant of the sampling cycle respectively, means adapted to derive from the difference between the first and second sample peak pulse voltages a reference potential corresponding to a predetermined percentage of the difference voltage, means adapted to control said voltage generator output to initiate the sampling of the signal at a third predetermined instant in time whereby a third sample peak pulse voltage is produced at the output of the sampling circuit and comparator circuit means connected to the output of the sampling circuit means and having applied thereto said reference potential, said comparator circuit means being adapted to have an output indicating whether said third sample peak pulse voltage exceeds the amplitude of the reference potential.

References Cited by the Examiner
UNITED STATES PATENTS 3,023,360   2/62   Czulius _______________ 324—68
3,041,537   6/62   Cagle _________________ 324—68

WALTER L. CARLSON, *Primary Examiner.*

UNITED STATES PATENT OFFICE
CERTIFICATE OF CORRECTION

Patent No. 3,197,700                                July 27, 1965

Paul Schwartz et al.

It is hereby certified that error appears in the above numbered patent requiring correction and that the said Letters Patent should read as corrected below.

Column 2, line 38, for "aqual" read -- equal --; column 3, lines 69 and 70, for "feature" read -- features --; column 4, line 70, for "is", first occurrence, read -- it --; column 5, line 21, for "samplying" read -- sampling --; column 10, line 22, for "to", first occurrence, read -- at --; line 70, for "the", first occurrence, read -- its --; column 11, line 13, for "of", second occurrence, read -- to --; line 42, for "21" read -- 121 --; line 54, for "slow" read -- slowly --; column 12, line 15, for "24" read -- 34 --; line 35, for "when" read -- where --; column 13, line 62, for "plate" read -- late --; column 14, line 3, for "circiut" read -- circuit --; column 17, line 74, after "signal" insert -- voltage --; column 19, line 3, for "the", first occurrence, read -- that --; column 20, line 62, after "fourth" strike out the comma; column 23, line 11, for "votlage" read -- voltage --; line 18, before "generator" insert -- voltage --.

Signed and sealed this 15th day of March 1966.

(SEAL)
Attest:

ERNEST W. SWIDER                         EDWARD J. BRENNER
Attesting Officer                       Commissioner of Patents